US012614146B2

(12) United States Patent <br> Jin et al.

(10) Patent No.: US 12,614,146 B2 <br> (45) Date of Patent: Apr. 28, 2026

(54) MACHINE LEARNING PREDICTION OF LATE DELIVERIES OF ORDERS PLACED WITH AN ONLINE SYSTEM

(71) Applicant: Maplebear Inc., San Francisco, CA (US)

(72) Inventors: Lei Jin, Champaign, IL (US); Jianhui Tian, Fremont, CA (US); Parikshit Verma, College Station, TX (US); Liang Chen, Sunnyvale, CA (US); Xiangyu Wang, San Jose, CA (US); Youdan Xu, Burlingame, CA (US)

(73) Assignee: Maplebear Inc, San Francisco, CA (US)

( * ) Notice: Subject to any disclaimer, the term of this patent is extended or adjusted under 35 U.S.C. 154(b) by 0 days.

(21) Appl. No.: 18/643,973

(22) Filed: Apr. 23, 2024

(65) Prior Publication Data

US 2025/0328854 A1 Oct. 23, 2025

(51) Int. Cl.
*G06Q 10/0834* (2023.01)
*G06Q 10/087* (2023.01)
*G06Q 30/0202* (2023.01)

(52) U.S. Cl.
CPC ....... *G06Q 10/0834* (2013.01); *G06Q 10/087* (2013.01); *G06Q 30/0202* (2013.01)

(58) Field of Classification Search
CPC ............. G06Q 10/0834; G06Q 10/087; G06Q 30/0202

USPC ................. 705/334, 330, 333, 335, 337, 1.1
See application file for complete search history.

(56) References Cited

U.S. PATENT DOCUMENTS

| | | | | |
|---|---|---|---|---|
| 10,176,448 B1 * | 1/2019 | Rhodes | ................... | G01S 19/14 |
| 2020/0118071 A1 * | 4/2020 | Venkatesan | ............ | G06N 20/00 |
| 2022/0067657 A1 * | 3/2022 | Neumann | ........ | G06Q 10/08355 |
| 2023/0325759 A1 * | 10/2023 | Lee | .................... | G06Q 10/0833 |

FOREIGN PATENT DOCUMENTS

| | | | | |
|---|---|---|---|---|
| JP | WO2022133330 A5 * | 12/2024 | | |
| KR | 102079085 B1 * | 2/2020 | ......... | G06Q 30/0633 |
| KR | 20220145692 A * | 10/2022 | ......... | G06Q 30/0202 |
| WO | WO-2021119556 A1 * | 6/2021 | ........... | G06Q 10/047 |

* cited by examiner

*Primary Examiner* — Akiba K Robinson
(74) *Attorney, Agent, or Firm* — Fenwick & West LLP

(57) ABSTRACT

A trained model is used to predict, in real time, a late delivery rate for orders placed at an online system. Upon receiving data related to the placed orders and signals related to supply and demand states of the online system, the online system applies a delivery prediction model trained to output, based on the received data and signals, late delivery scores, each late delivery score indicative of a respective rate of late deliveries for a respective service option for delivery of the orders. The online system compares each late delivery score with a respective threshold score, and responsive to each late delivery score being greater than the respective threshold score, the online system triggers an action in relation to the respective service option for delivery of the orders.

18 Claims, 7 Drawing Sheets

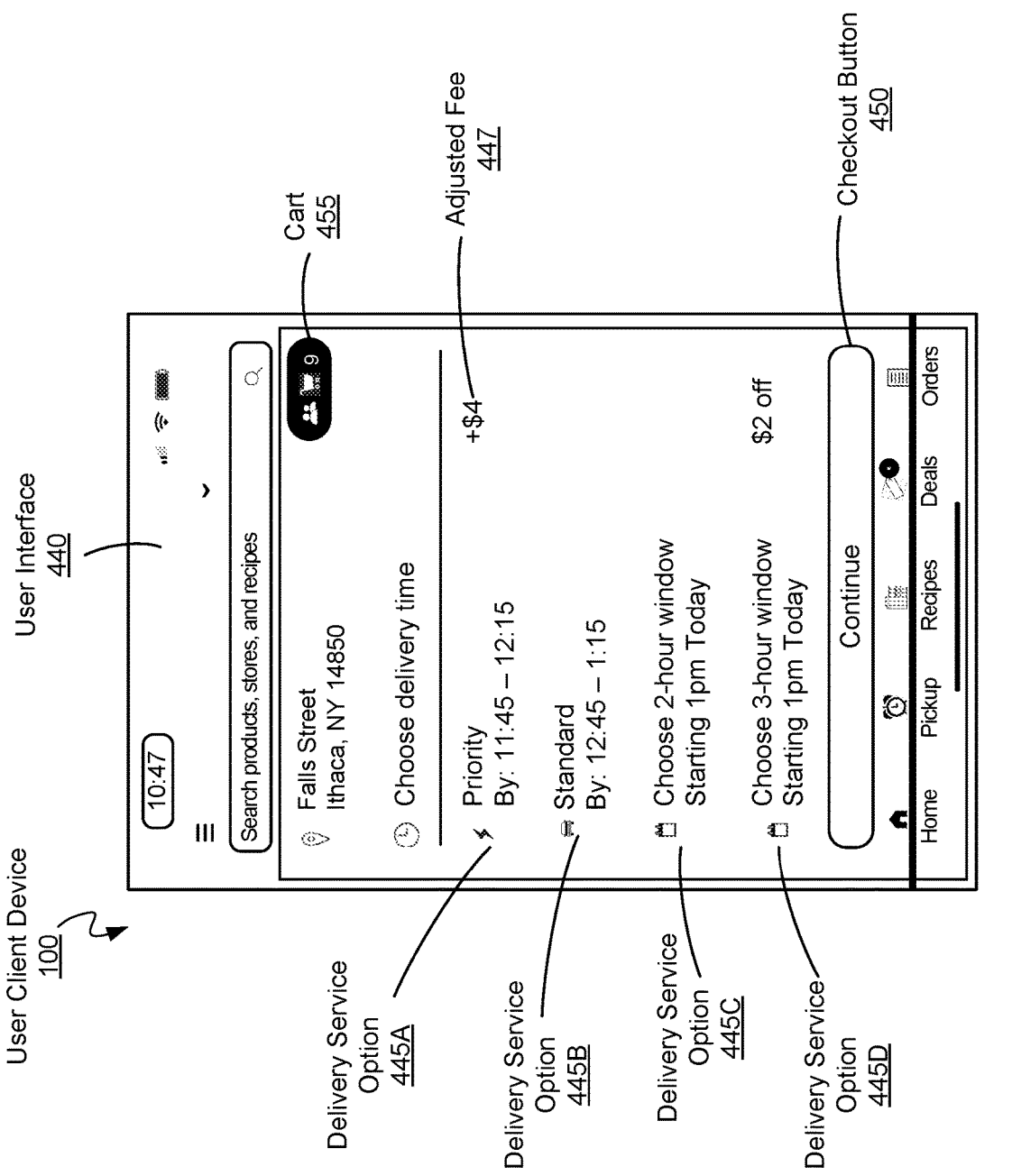

User Client Device 100

User Interface 440

Cart 455

Adjusted Fee 447

Checkout Button 450

Delivery Service Option 445A

Delivery Service Option 445B

Delivery Service Option 445C

Delivery Service Option 445D

10:47

Search products, stores, and recipes

Falls Street
Ithaca, NY 14850

Choose delivery time

Priority
By: 11:45 – 12:15    +$4

Standard
By: 12:45 – 1:15

Choose 2-hour window
Starting 1pm Today

Choose 3-hour window
Starting 1pm Today    $2 off

Continue

Home    Pickup    Recipes    Deals    Orders

FIG. 4C

MACHINE LEARNING PREDICTION OF LATE DELIVERIES OF ORDERS PLACED WITH AN ONLINE SYSTEM

BACKGROUND

An online system, such as an online concierge system, allows users to place orders with different delivery service options. In general, the online system provides two distinct sets of delivery service options, i.e., "Estimated Time of Arrival (ETA) availability" delivery service options with a fast delivery experience (e.g., as soon as 15 minutes), and scheduled delivery service options that are scheduled ahead for delivery at a specified future time instant. The ETA delivery service options can provide multiple levels of ETA to users, such as sETA (i.e., standard ETA delivery service option) and pETA (i.e., priority ETA delivery service option).

Conventionally, the online system measures a marketplace health characterized by the balance between supply and demand for deliveries using a metric like "predicted lates," which is a machine-learning prediction of the number or rate of late deliveries during a specific time period. The prediction of late deliveries can be used to make decisions about whether to offer certain delivery service options (e.g., sETAs, pETAs, or scheduled deliveries) to users due to supply constraints. However, this metric does not differentiate the predicted late deliveries between sETA and pETA deliveries, which often results in suboptimal performance. Furthermore, the online system conventionally uses a linear machine-learning model to map the predicted lates to batching of orders. But the prediction of late deliveries also relies on batching features, and since the predictions are used to control the batching process, this creates a feedback loop and a self-perpetuating cycle. Furthermore, a zonal structure of the linear machine-learning model (e.g., hundreds of linear functions of the machine-learning model) adds extra maintenance cost.

Therefore, there is a need for a new machine-learning model approach when predicting late deliveries of online orders.

SUMMARY

Embodiments of the present disclosure are directed to using a trained machine-learning model of an online system (e.g., online concierge system) to predict, in real time, a late delivery rate for orders placed at the online system. The trained machine-learning model presented herein does not rely on batching features and does not have the zonal structure, i.e., a single trained machine-learning model can be used to predict a rate of late deliveries for different zonal coverages.

In accordance with one or more aspects of the disclosure, the online system receives, from a plurality of devices associated with a plurality of users of an online system and via a network, data related to a plurality of orders placed by the plurality of users at the online system. The online system receives, from at least one of the plurality of devices associated with the plurality of users or a plurality of devices associated with a plurality of pickers and via the network, signals related to a supply state of the online system and a demand state of the online system. The online system accesses a delivery prediction model of the online system, wherein the delivery prediction model is trained to predict a set of rates of late deliveries for a set of service options for delivery of the plurality of orders. The online system applies the delivery prediction model to output, based on the received data and the received signals, a set of late delivery scores, each late delivery score of the set of late delivery scores indicative of a respective rate of the set of rates of late deliveries for a respective service option of the set of service options for delivery of the plurality of orders. The online system compares each late delivery score of the set of late delivery scores with a respective threshold score of a set of threshold scores. Responsive to each late delivery score being greater than the respective threshold score, the online system triggers an action in relation to the respective service option for delivery of the plurality of orders.

BRIEF DESCRIPTION OF THE DRAWINGS

FIG. 4C illustrates an example user interface of a device associated with a user of an online concierge system with a full set of available delivery service options and an adjusted fee for one delivery service option, in accordance with one or more embodiments.

DETAILED DESCRIPTION

Figure 1:
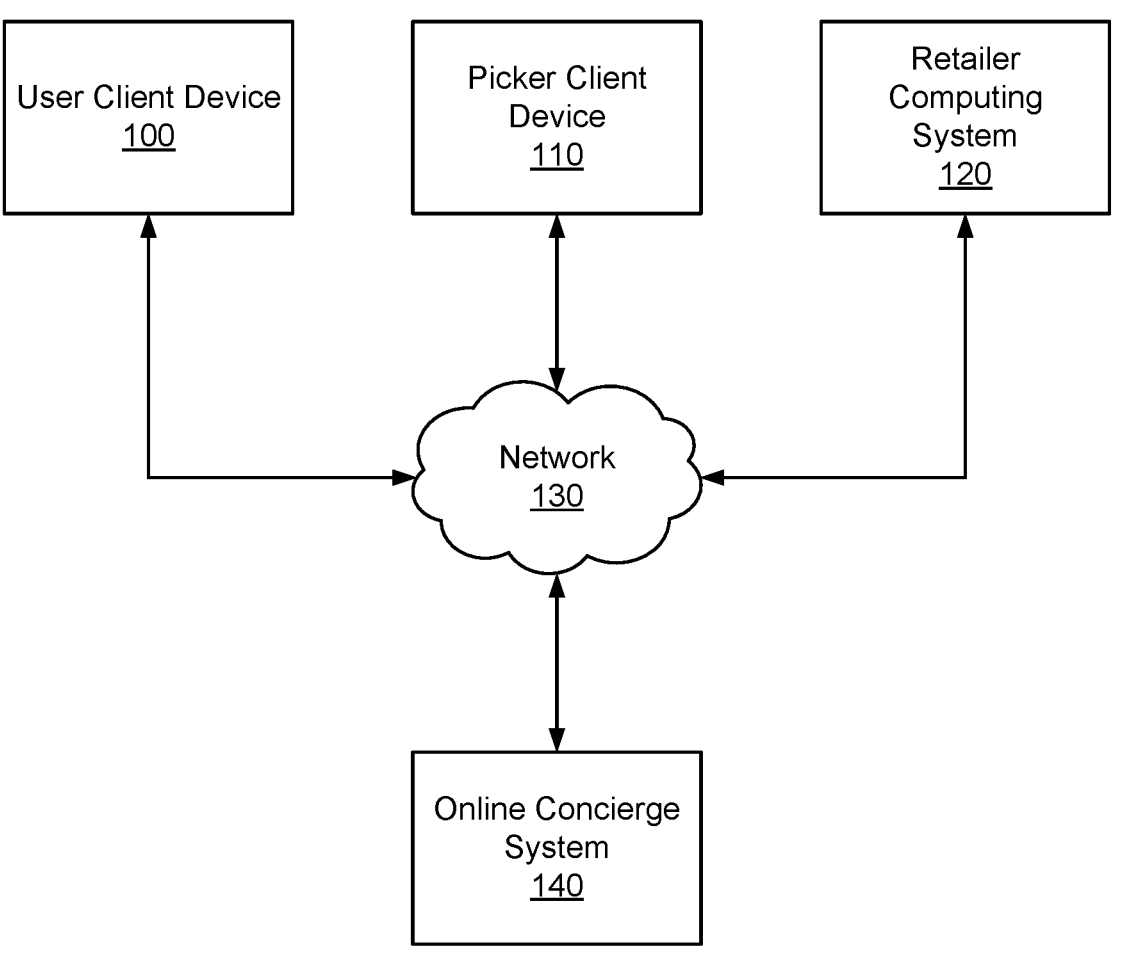
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 allows users to place orders for delivery (i.e., fulfillment) with different delivery service options, i.e., at a future time or during a present time interval. A service option that provides a delivery of order at a future time can be referred to as a scheduled delivery service option. A service option that provides a delivery of order at a present time interval can be referred to as an immediate delivery service option. An immediate delivery service option is based on an "Estimated Time of Arrival (ETA) availability", and can provide multiple levels of ETAs to users, such as sETA (i.e., standard ETA delivery service option) having a first delivery time and pETA (i.e., priority ETA delivery service option) having a second delivery time that is less than the first delivery time. Both the first and second delivery times are less than a delivery time associated with the scheduled delivery service option. In general, the online concierge system 140 may not offer the immediate delivery service option if the current orders exceed the supply of pickers at the online concierge system 140 capable of delivering the orders. In such cases, the online concierge system 140 may disable the immediate delivery service option as the supply limit approaches.

To avoid late deliveries of orders, the online concierge system 140 uses a trained prediction model (e.g., machine-learning model) to predict, during a current time window (e.g., the next 30 minutes), a rate of late deliveries for orders placed at the online concierge system 140. An order is considered late when it is delivered to a user of the online concierge system 140 after a scheduled delivery time associated with a delivery service option selected by the user. If the predicted rate of late deliveries is above one or more thresholds, the online concierge system 140 may disable one or more of the delivery service options for the current time period. Alternatively, the online concierge system 140 may change a price associated with a delivery service option, such as increase a price for the immediate delivery service option. To improve the prediction of late deliveries, the online concierge system 140 trains the prediction model with inputs that do not depend on batching decisions made by the online concierge system 140. In this manner, the prediction of late deliveries is based on marketplace conditions and not on decisions that the online concierge system 140 makes based on this same prediction of late deliveries (e.g., batching operations), which would cause a feedback loop in the prediction model.

The prediction model of the online concierge system 140 presented herein predicts, in real time and for a given marketplace, a rate of late deliveries for online orders, aiming to maintain a balance between a supply of pickers and demand of users at the online concierge system 140. In this manner, the prediction model can efficiently manage availability of different delivery service options while preventing a surge in prices for scheduling certain delivery service options (e.g., immediate delivery service options). The online concierge system 140 is described in further detail below with regards to FIG. 2.

Figure 2:
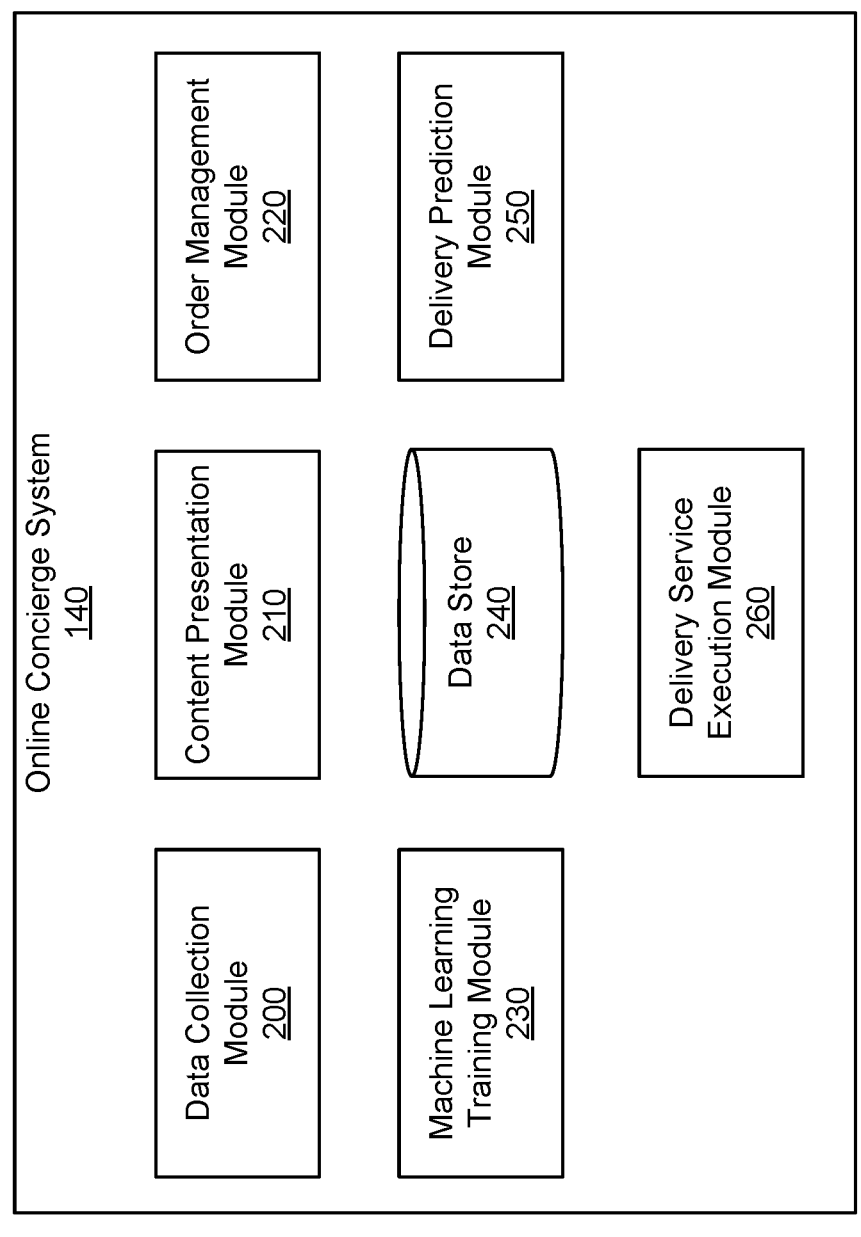
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a delivery prediction module 250, and a delivery service execution module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification).

After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The delivery prediction module 250 may access a delivery prediction model (e.g., machine-learning model) that is trained to predict a likelihood of a late delivery for orders placed by a collection of users of the online concierge system 140. The delivery prediction module 250 may deploy the delivery prediction model to run a machine-learning algorithm to output, based on a set of inputs, the predicted likelihood of late delivery. In one or more embodiments, the delivery prediction module 250 outputs the predicted likelihood as a predicted rate of late deliveries for orders placed at the online concierge system 140. The predicted rate of late deliveries output by the delivery prediction model may be a value between 0 and 1. In one or more embodiments, the delivery prediction model is implemented as a light gradient boosting supervised machine-learning model. A set of parameters for the delivery prediction model may be stored at one or more non-transitory computer-readable media of the delivery prediction module 250. Alternatively, the set of parameters for the delivery prediction model may be stored at one or more non-transitory computer-readable media of the data store 240.

The delivery prediction model may predict a likelihood of a late delivery for orders associated with the sETA delivery service option, as well as another likelihood of a late delivery for orders associated with the pETA delivery service option. The delivery prediction model may predict a likelihood of a late delivery for orders placed at any geographic zone, i.e., the single delivery prediction model can be used to predict likelihoods of late deliveries at multiple geographic zones. The likelihood of late delivery output by the delivery prediction model may be indicative of a rate or percentage of late deliveries for a defined time period (e.g., the next 30 minutes). The delivery prediction model may include a first sub-model (e.g., machine-learning model) that is trained to predict a rate of late deliveries within any given geographic zone for orders associated with the pETA delivery service option. And, the delivery prediction model may include a second sub-model (e.g., machine-learning model) that is trained to predict a rate of late deliveries within any given geographic zone for orders associated with the sETA delivery service option.

In providing the set of inputs to the delivery prediction model, the delivery prediction module 250 may provide signals related to marketplace supply and demand as input features for the delivery prediction model. The marketplace supply and demand signals may include information about various features, such as a number of online storefront visits within a specific time period (e.g., the last 30 minutes), a total number of orders placed within a specific time period (e.g., the last 30 minutes), a number of currently unassigned orders, a number of orders that are due for delivery, information about delivery volumes within a specific time period (e.g., hour, two hours, etc.), a number of completed orders within a time period (e.g., the last 30 minutes), information about occurrences of delivery lateness, a number of available pickers within a given geographic zone, order acceptance times associated with pickers, sizes of geographic zones (e.g., as assigned based on orders placed within a defined time period, such as the last seven days), information about a country or state where orders are placed, day of the week, hour of the day, etc. The aforementioned marketplace supply and demand signals may be received at the online concierge system 140 (e.g., at the delivery prediction module 250) from user client devices 100 and/or picker client devices 110 via the network 130.

Note that the marketplace supply and demand features that are input into the delivery prediction model are independent of batching operations, i.e., in general, the input features provided to the delivery prediction model do not rely on actions taken by the online concierge system 140. In this manner, the feedback loop with a self-perpetuating cycle is avoided at the delivery prediction model. Features affected by batching decisions made by the online concierge system 140 are not preferred to be input features for the delivery prediction model, because these features do not capture marketplace features, but instead the ability to service orders in the way that they were batched.

The delivery service execution module 260 may use predicted late delivery signals output by the delivery prediction model to refine offerings of delivery service options at a checkout page of a user interface of the user client device 100. More specifically, the delivery service execution module 260 may perform, based on the predicted late delivery signals, certain actions in relation to delivery service options that can be offered at the online concierge system 140. In one or more embodiments, the delivery service execution module 260 turns off (i.e., disable) a corresponding delivery service option at the checkout page when a predicted rate of late deliveries for orders associated with that delivery service option is above a threshold rate. For example, when a predicted rate of late deliveries for orders associated with the pETA delivery service option is above a first tunable threshold rate, the delivery service execution module 260 turns off the pETA delivery service option, i.e., the pETA delivery service option is not offered at the checkout page. Similarly, when a predicted rate of late deliveries for orders associated with the sETA delivery service option is above a second tunable threshold rate, the delivery service execution module 260 turns off the sETA delivery service option, i.e., the sETA delivery service option is not offered at the checkout page.

Alternatively, when a predicted rate of late deliveries for orders associated with a specific delivery service option is above a threshold rate, the delivery service execution module 260 may trigger an increase of a service fee for that delivery service option at the checkout page while maintaining that delivery service option in order to reduce a demand for that delivery service option and prevent late deliveries for that delivery service option. For example, the delivery service execution module 260 may increase the service fee for the specific delivery service option by an amount that is proportional to a difference between the predicted rate of late deliveries and the threshold rate.

Hence, based on the predicted late delivery signals output by the delivery prediction model, the delivery service execution module 260 may set pricing of various delivery service options at the checkout page.

The content presentation module 210 may receive action signals from the delivery service execution module 260 in relation to offerings of delivery service options at a user interface of the user client device 100. Based on the received action signals, the content presentation module 210 may cause the user client device 100 to display, at the checkout, the user interface with a list of one or more delivery service options for selection by a user of the online concierge system 140. In general, the content presentation module 210 causes the user client device 100 to always display an availability of the scheduled delivery service option having a first delivery time associated with an order placed by the user. In accordance with the received action signals from the delivery service execution module 260, the content presentation module 210 may cause the user client device 100 to display the user interface with an available immediate delivery service option, if any. For example, when the delivery service execution module 260 turns off the pETA delivery service option, the content presentation module 210 may cause the user client device 100 to display the user interface with an availability of the sETA delivery service option for the order having a second delivery time that is less than the first delivery time. Similarly, in accordance with the received action signals from the delivery service execution module 260, the content presentation module 210 may cause the user client device 100 to display the user interface with an appropriate fee for each available delivery service option as being set by the delivery service execution module 260.

The machine-learning training module 230 may perform initial training of the delivery prediction model using training data. The machine-learning training module 230 may generate the training data by collecting historical data about late deliveries over a defined time period (e.g., the last week, last two weeks, last month, etc.). The machine-learning training module 230 may retrieve the historical data about late deliveries from, e.g., the data store 240. For example, the machine-learning training module 230 may train the delivery prediction model using the historical data about late deliveries spanning the last eight weeks, where the data spanning the first six weeks may serve as a training dataset, and the data spanning the final two weeks may serve as a validation dataset. Hence, the training data may include the training dataset and the validation dataset. The machine-learning training module 230 may train the delivery prediction model using the training data to generate initial values for the set of parameters of the delivery prediction model.

The machine-learning training module 230 may re-train the delivery prediction model as new data about late deliveries are acquired to keep the delivery prediction model relevant as the marketplace features (e.g., supply and demand) change over time. For example, the new data about late deliveries may be acquired daily, and the machine-learning training module 230 may perform daily re-training of the delivery prediction model. The machine-learning training module 230 may re-train the delivery prediction model by updating the set of parameters of the delivery prediction model using the newly acquired data about late deliveries.

Figure 3:
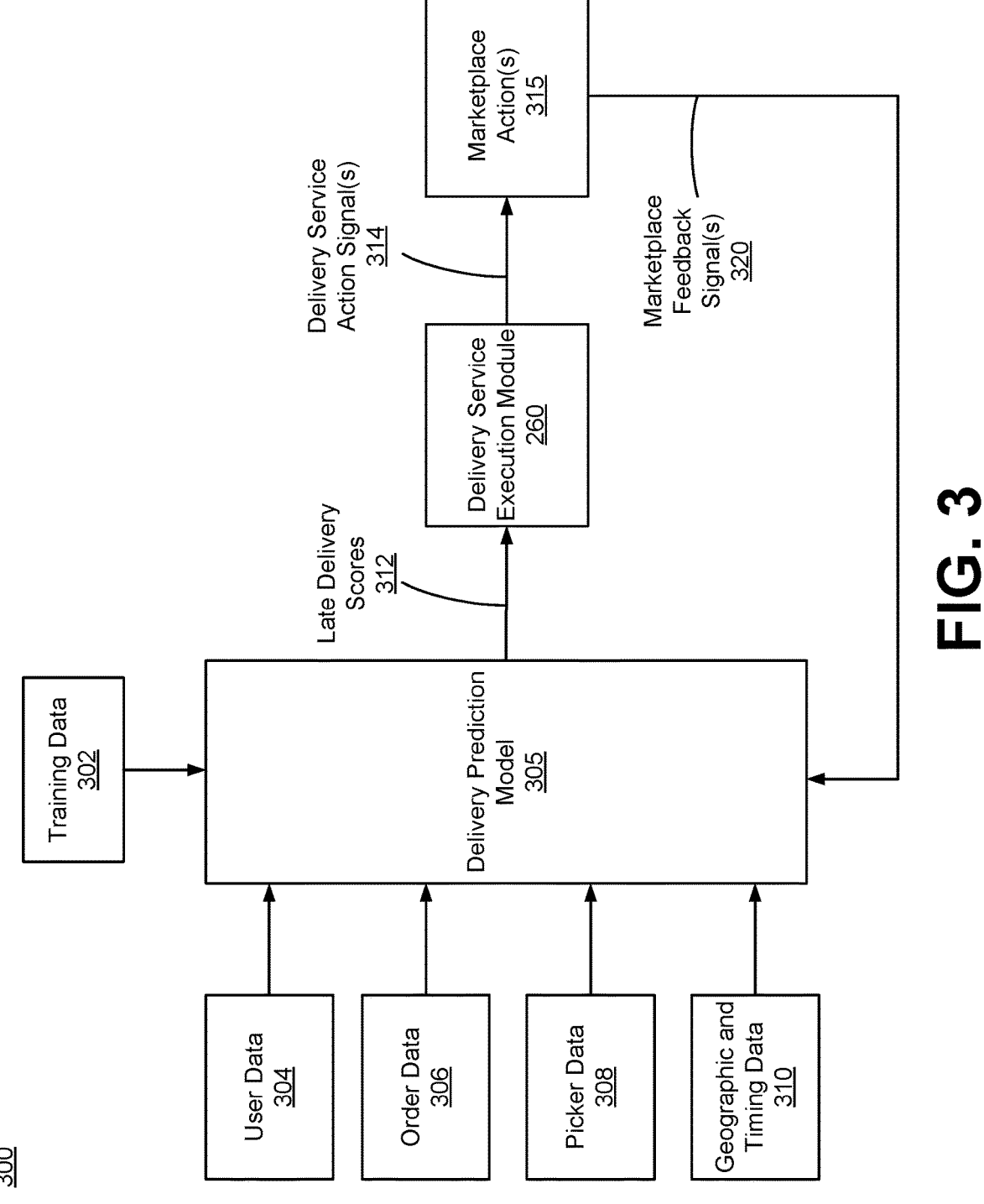
FIG. 3 illustrates an example architectural flow diagram of using a trained model of an online concierge system to predict, in real time, rates of late deliveries for different service options for delivery of orders placed at the online concierge system, in accordance with one or more embodiments.

FIG. 3 illustrates an example architectural flow diagram 300 of using a delivery prediction model 305 of the online concierge system 140 to predict, in real time, rates of late deliveries for different service options for delivery of orders placed at the online concierge system 140, in accordance with one or more embodiments. First, the online concierge system 140 may perform (e.g., via the machine-learning training module 230) initial training of the delivery prediction model 305 using training data 302 to generate initial values for the set of parameters of the delivery prediction model 305. The training data 302 may be generated (e.g., via the machine-learning training module 230) by retrieving (e.g., from the data store 240) historical data about late deliveries over a defined time period (e.g., the last week, last two weeks, last month, etc.). After the training process is completed, the online concierge system 140 may provide various inputs to the delivery prediction model 305 (e.g., via the delivery prediction module 250), such as user data 304, order data 306, picker data 308, and/or geographic and timing data 310. In general, the inputs provided to the delivery prediction model 305 may be related to information about a current supply state of the online concierge system 140 and a current demand state of the online concierge system 140. Some additional input features not shown in FIG. 3 suitable for predicting rates of late deliveries for different delivery service options may be further provided to the delivery prediction model 305.

In providing the user data 304 to the delivery prediction model 305, the online concierge system 140 may provide (e.g., via the delivery prediction module 250) information about a number of online storefront visits by a collection of users within a time period (e.g., the last 30 minutes, hour, etc.), a number of completed deliveries confirmed by a first set of users within a time period (e.g., the last 30 minutes, hour, etc.), a number of occurrences of late deliveries confirmed by a second set of users within the time period, some other user-related information, or some combination thereof. The delivery prediction module 250 may receive the user data 304 from user client devices 100 via the network 130.

In providing the order data 306 to the delivery prediction model 305, the online concierge system 140 may provide (e.g., via the delivery prediction module 250) information about a total number of orders placed within a time period (e.g., the last 30 minutes, hour, etc.), a number of currently unassigned orders, a number of orders that are due for delivery, a number of completed orders within a time period (e.g., the last 30 minutes, hour, etc.), some other order-related information, or some combination thereof. The delivery prediction module 250 may receive the order data 306 from user client devices 100 via the network 130.

In providing the picker data 308 to the delivery prediction model 305, the online concierge system 140 may provide (e.g., via the delivery prediction module 250) information about a number of available pickers within a given geographic zone, order acceptance times associated with pickers, a number of occurrences of late deliveries confirmed by a set of pickers within a time period (e.g., the last 30 minutes, hour, etc.), some other picker-related information, or some combination thereof. The delivery prediction module 250 may receive the picker data 308 from picker client devices 110 via the network 130.

In providing the geographic and timing data 310 to the delivery prediction model 305, the online concierge system 140 may provide (e.g., via the delivery prediction module 250) information about sizes of geographic zones (e.g., as assigned based on orders placed within a defined time period), information about a country or state where orders are placed, timestamps of the placed orders (e.g., day of the week, hour of the day, etc.), some other geographic and timing information, or some combination thereof. The delivery prediction module 250 may receive the geographic and timing data 310 from user client devices 100 and/or picker client devices 110 via the network 130.

The delivery prediction model 305 may apply a machine-learning algorithm to the user data 304, the order data 306, the picker data 308, and/or the geographic and timing data 310 to output late delivery scores 312 for a set of service options for delivery of orders placed by users of the online concierge system 140 within a specific time period (e.g., the last 30 minutes, hour, etc.). Each late delivery score 312 (e.g., value between 0 and 1) may be indicative of a rate of late deliveries for a corresponding service option for delivery of the placed orders. A higher value of each late delivery score 312 may be indicative of a higher rate of late deliveries for the corresponding service option, and vice versa. The late delivery scores 312 for the set of service options for delivery of the placed orders output by the delivery prediction model 305 may be passed to the delivery service execution module 260.

The delivery service execution module 260 may generate, based on the late delivery scores 312, one or more delivery service action signals 314 in relation to one or more service options for delivery of the set of service options. The delivery service execution module 260 may compare each late delivery score 312 with a corresponding threshold score for the corresponding service option for delivery of the placed orders. Responsive to each late delivery score 312 being greater than the corresponding threshold score, the delivery service execution module 260 may generate a corresponding delivery service action signal 314 and trigger an action in relation to the corresponding service option for delivery of the placed orders.

One or more actions triggered by the delivery service execution module 260 can be cumulatively referred to as marketplace action(s) 315. For example, when a late delivery score 312 for a specific service option for delivery of the placed orders (e.g., pETA delivery service option) output by the delivery prediction model 305 is greater than a threshold score, the delivery service execution module 260 may generate a delivery service action signal 314 to turn off an availability of that specific delivery service option, i.e., to disable that specific delivery service option. Alternatively, when the late delivery score 312 for the specific service option for delivery of the placed orders (e.g., pETA delivery service option) is greater than the threshold score, the delivery service execution module 260 may generate a delivery service action signal 314 to increase a price of a service fee for that specific delivery service option.

Upon performing the one or more marketplace actions 315 based on the one or more delivery service action signals 314, one or more marketplace feedback signals 320 may be generated. The one or more marketplace feedback signals 320 may include information about selection by the users of the set of service options for delivery of the placed orders, newly acquired data with information about an updated supply state of the online concierge system 140, newly acquired data with information about an updated demand state of the online concierge system 140, some other marketplace-related information, or some combination thereof. The one or more marketplace feedback signals 320 may be recorded at the online concierge system 140 (e.g., at the data store 240) and utilized (e.g., by the machine-learning training module 230) to re-train the delivery prediction model 305. By utilizing the one or more marketplace feedback signals 320, the machine-learning training module 230 may update the set of parameters of the delivery prediction model 305 and continuously improve the machine-learning algorithm of the delivery prediction model 305.

Figure 4A:
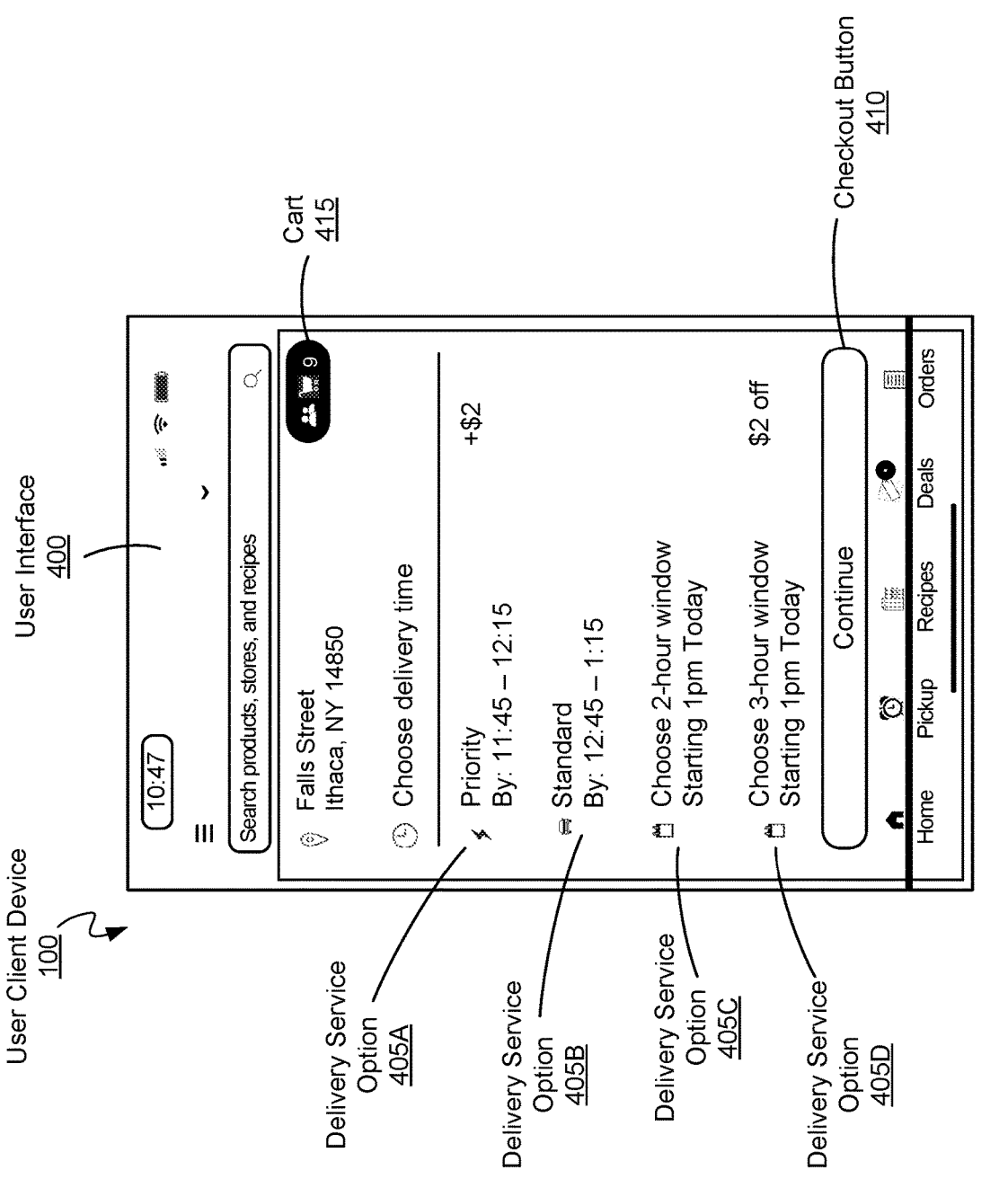
FIG. 4A illustrates an example user interface of a device associated with a user of an online concierge system with a full set of available delivery service options, in accordance with one or more embodiments.

FIG. 4A illustrates an example user interface 400 of the user client device 100 with a full set of available delivery service options, in accordance with one or more embodiments. The content presentation module 210 may cause the user client device 100 to display the user interface 400 at the checkout, i.e., the user interface 400 is a checkout page associated with a cart 415. Upon predicting by the delivery prediction model of the online concierge system 140 that none of available delivery service options is associated with late delivery scores greater than threshold scores, the content presentation module 210 may cause the user client device 100 to display the user interface 400 with the full set of available delivery service options. Thus, the content presentation module 210 may cause the user client device 100 to display the user interface 400 with a delivery service option 405A (e.g., pETA delivery service option), a delivery service option 405B (e.g., sETA delivery service option), a delivery service option 405C (e.g., 2-hour window scheduled delivery service option), and a delivery service option 405D (e.g., 3-hour window scheduled delivery service option). A user may utilize the user interface 400 to select any of the delivery service options 405A, 405B, 405C, 405D and proceed to the checkout by pressing a checkout button 410.

Figure 4B:
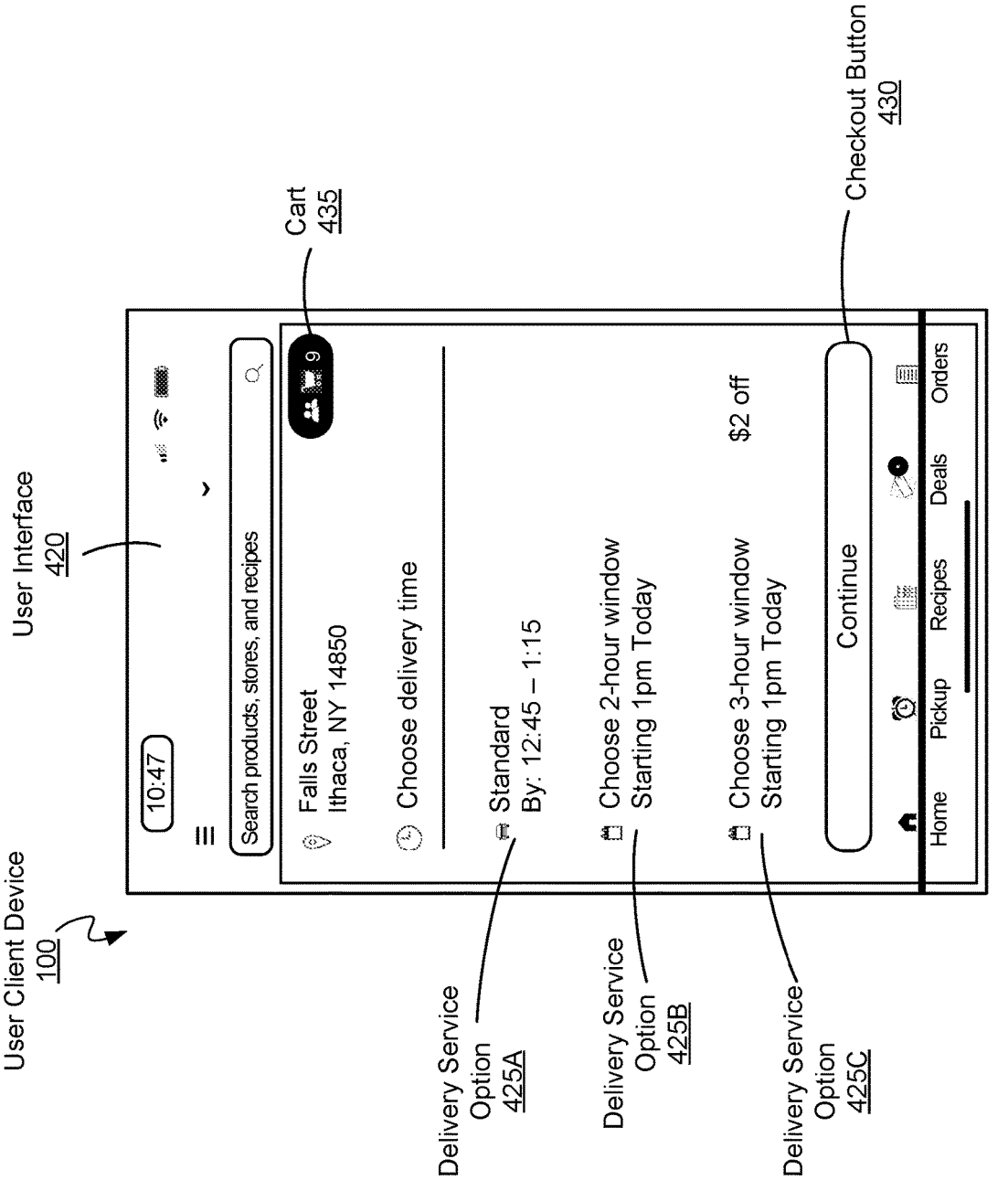
FIG. 4B illustrates an example user interface of a device associated with a user of an online concierge system with a reduced set of available delivery service options, in accordance with one or more embodiments.

FIG. 4B illustrates an example user interface 420 of the user client device 100 with a reduced set of available delivery service options, in accordance with one or more embodiments. The content presentation module 210 may cause the user client device 100 to display the user interface 420 at the checkout, i.e., the user interface 420 is a checkout page associated with a cart 435. Upon predicting by the delivery prediction model that one of available delivery service options (e.g., pETA delivery service option) is associated with a late delivery score greater than a threshold score, the delivery service execution module 260 may disable that one delivery service option. Thus, in such a case, the content presentation module 210 may cause the user client device 100 to display the user interface 400 with the reduced set of available delivery service options. As shown in FIG. 4B, the user client device 100 displays the user interface 420 with one less delivery service option than what is displayed at the user interface 400 of FIG. 4A, i.e., the pETA delivery service option is disabled. Hence, the user client device 100 displays the user interface 420 with three instead of four delivery service options, e.g., a delivery service option 425A (e.g., sETA delivery service option), a delivery service option 425B (e.g., 2-hour window scheduled delivery service option), and a delivery service option 425C (e.g., 3-hour window scheduled delivery service option). A user may utilize the user interface 420 to select any of the delivery service options 425A, 425B, 425C and proceed to the checkout by pressing a checkout button 430.

FIG. 4C illustrates an example user interface 440 of the user client device 100 with a full set of available delivery service options and an adjusted fee for one delivery service option, in accordance with one or more embodiments. The content presentation module 210 may cause the user client device 100 to display the user interface 440 at the checkout, i.e., the user interface 440 is a checkout page associated with a cart 455. Upon predicting by the delivery prediction model that one of available delivery service options (e.g., pETA delivery service option) is associated with a late delivery score greater than a threshold score, the delivery service execution module 260 may increase a service fee associated with that one delivery service option in order to reduce a demand for that one delivery service option and prevent late deliveries for that one delivery service option. Thus, in such a case, the content presentation module 210 may cause the user client device 100 to display the user interface 440 with the full set of available delivery service options but with an increased service fee for one specific delivery service option. As shown in FIG. 4C, the user client device 100 displays the user interface 440 with the same set of available delivery service options as the user interface 400 of FIG. 4A, e.g., a delivery service option 445A (e.g., pETA delivery service option), a delivery service option 445B (e.g., sETA delivery service option), a delivery service option 445C (e.g., 2-hour window scheduled delivery service option), and a delivery service option 445D (e.g., 3-hour window scheduled delivery service option). However, the delivery service option 445A is displayed with an adjusted fee 447 (e.g., increased from \$2 to \$4 compared to the fee for the same delivery service option 405A in FIG. A). A user may utilize the user interface 440 to select any of the delivery service options 445A, 445B, 445C, 445D and proceed to the checkout by pressing a checkout button 450.

Figure 5:
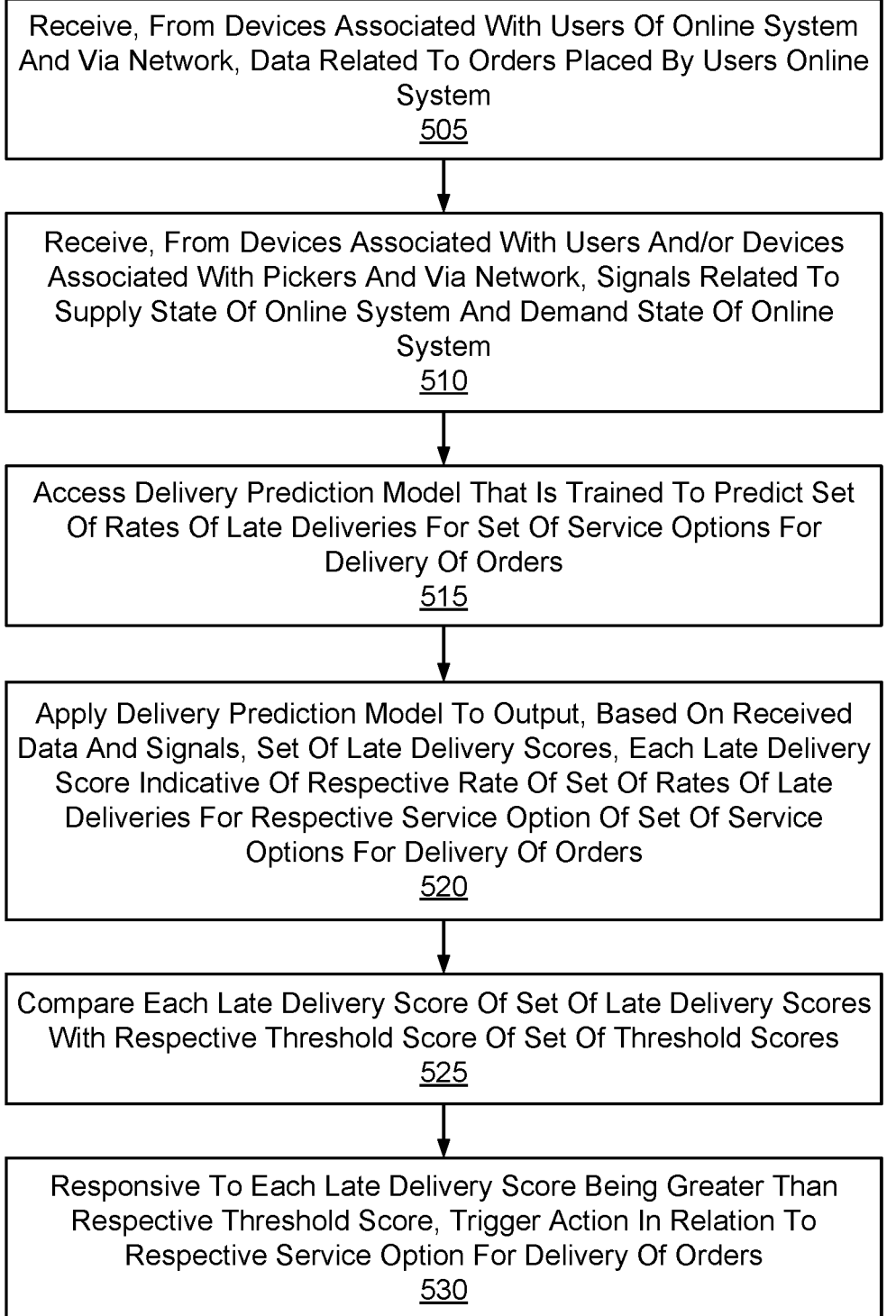
FIG. 5 is a flowchart for a method of using a trained model of an online concierge system to predict a rate of late deliveries for orders placed at the online concierge system, in accordance with one or more embodiments.

FIG. 5 is a flowchart for a method of using a trained model of an online concierge system to predict a rate of late deliveries for orders placed at the online concierge system, in accordance with one or more embodiments. Alternative embodiments may include more, fewer, or different steps from those illustrated in FIG. 5, and the steps may be performed in a different order from that illustrated in FIG. 5. These steps may be performed by an online concierge system (e.g., the online concierge system 140). Additionally, each of these steps may be performed automatically by the online concierge system without human intervention.

The online concierge system 140 receives 505 (e.g., at the delivery prediction module 250), from a plurality of devices associated with a plurality of users of the online concierge system 140 (e.g., user client devices 100) and via a network (e.g., the network 130), data related to a plurality of orders placed by the plurality of users at the online concierge system 140. The online concierge system 140 receives 510 (e.g., at the delivery prediction module 250), from at least one of the plurality of devices associated with the plurality of users or a plurality of devices associated with a plurality of pickers (e.g., picker client devices 110) and via the network, signals related to a supply state of the online concierge system 140 and a demand state of the online concierge system 140.

The online concierge system 140 may receive the data related to the plurality of orders by receiving (e.g., at the delivery prediction module 250) information about at least one of: a number of visits of a storefront page of an application of the online concierge system 140 running on the devices associated with the plurality of users, a number of orders placed at the online concierge system 140 within a first time period, a number of current orders placed at the online system that are due for delivery, or a number of orders that are fulfilled within a second time period. The online concierge system 140 may receive the signals by receiving (e.g., at the delivery prediction module 250) information about at least one of: a number of pickers of the plurality of pickers that are available for fulfillment of the plurality of orders, acceptance times associated with the plurality of pickers for fulfillment of the plurality of orders, sizes of geographic zones used for assigning the plurality of pickers to fulfill the plurality of orders, information about one or more geographic locations where the plurality of orders were placed, or timestamps of placements for the plurality of orders.

The online concierge system 140 accesses 515 a delivery prediction model of the online concierge system 140 (e.g., via the delivery prediction module 250), wherein the delivery prediction model is trained to predict a set of rates of late deliveries for a set of service options for delivery of the plurality of orders. The online concierge system 140 applies 520 the delivery prediction model (e.g., via the delivery prediction module 250) to output, based on the received data and the received signals, a set of late delivery scores, each late delivery score of the set of late delivery scores indicative of a respective rate of the set of rates of late deliveries for a respective service option of the set of service options for delivery of the plurality of orders.

The online concierge system 140 may apply the delivery prediction model to predict, based on the received data and the received signals, a first late delivery score of the set of late delivery scores that is indicative of a first rate of the set of rates of late deliveries for a first service option of the set of service options (e.g., sETA delivery service option) having a first delivery time for delivery of the plurality of orders. The online concierge system 140 may further apply the delivery prediction model to predict, based on the received data and the received signals, a second late delivery score of the set of late delivery scores that is indicative of a second rate of the set of rates of late deliveries for a second service option of the set of service options (e.g., pETA delivery service option) having a second delivery time for delivery of the plurality of orders that is less than the first delivery time.

The online concierge system 140 compares 525 (e.g., via the delivery service execution module 260) each late delivery score of the set of late delivery scores with a respective threshold score of a set of threshold scores. Responsive to each late delivery score being greater than the respective threshold score, the online concierge system 140 triggers 530 (e.g., via the delivery service execution module 260) an action in relation to the respective service option for delivery of the plurality of orders. Responsive to the triggered action, the online concierge system 140 may cause (e.g., via the content presentation module 210) a device of the plurality of devices (e.g., the user client device 100) associated with a user of the plurality of users to display a user interface with one or more service options of the set of service options for delivery of an order of the plurality of orders. When each late delivery score is less than or equal to the respective threshold score, no restrictive action in relation to the respective service option may be triggered. In such cases, the online concierge system 140 may cause (e.g., via the content presentation module 210) the device to display the user interface with the respective service option for delivery of the order.

The online concierge system 140 may turn off (e.g., via the delivery service execution module 260) an availability of the first service option for the plurality of orders, when the first late delivery score is greater than a first threshold score. The online concierge system 140 may further turn off (e.g., via the delivery service execution module 260) an availability of the second service option for the plurality of orders, when the second late delivery score is greater than a second threshold score. Alternatively, the online concierge system 140 may increase (e.g., via the delivery service execution module 260) a price of a service fee for the second service option, when the second late delivery score is greater than a threshold score.

The online concierge system 140 may generate (e.g., via the machine-learning training module 230) training data by collecting historical data about late deliveries of a collection of orders placed at the online concierge system 140 by a collection of users of the online concierge system 140 over a defined time period (e.g., two months). The online concierge system 140 may train (e.g., via the machine-learning training module 230) the delivery prediction model using the training data to generate a set of initial values for a set of parameters of the delivery prediction model.

The online concierge system 140 may acquire (e.g., via the machine-learning training module 230), over a defined time period (e.g., 24 hours), data with information about at least one of an updated supply state of the online concierge system 140 or an updated demand state of the online concierge system 140. The online concierge system 140 may re-train the delivery prediction model by updating (e.g., via the machine-learning training module 230), using the acquired data, the set of parameters of the delivery prediction model. Additionally or alternatively, the online concierge system 140 may collect (e.g., via the machine-learning training module 230) feedback data with information about selection by the plurality of users of the set of service options for delivery of the plurality of orders. The online concierge system 140 may re-train the delivery prediction model by updating (e.g., via the machine-learning training module 230), using the collected feedback data, the set of parameters of the delivery prediction model.

Embodiments of the present disclosure are directed to the online concierge system 140 that uses a trained delivery prediction model to predict, in real time, a rate of late deliveries for orders placed at the online concierge system 140 within a given marketplace. The delivery prediction model presented herein avoids a feedback loop, i.e., in the context of the overall system in which the output of the delivery prediction model affects the batching, the delivery prediction model does not rely on input batching features. Because of that, the predicted rate of late deliveries output by the delivery prediction model is more accurate. Furthermore, the presented delivery prediction model has a simpler structure to maintain as it predicts a rate of late deliveries for different zonal coverages, thus avoiding having different parametric functions for different geographic zones.

The online concierge system 140 with the integrated delivery prediction model can positively influence user satisfaction, operational efficiency, and the overall health of the marketplace's service offerings. The online concierge system 140 presented herein enables the dynamic adjustment of delivery service options based on real time predictions of late deliveries, making the delivery service options more responsive to changing marketplace conditions. By providing more reliable predictions about late deliveries, the online concierge system 140 helps balance the picker supply with user demand, optimizing logistical operations and reducing overhead costs. At the same time, users of the online concierge system 140 receive more accurate time windows for delivery service options, thus reducing the uncertainty and frustration associated with late deliveries.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving, from a plurality of devices associated with a plurality of users of an online system and via a network, order data related to a plurality of orders placed by the plurality of users at the online system, the order data including real time information about a number of visits of a page of an application of the online system running on the plurality of devices within a time period, a number of currently unassigned orders of the plurality of orders, and a number of completed orders of the plurality of orders within the time period;

receiving, from at least one of the plurality of devices associated with the plurality of users or a plurality of devices associated with a plurality of pickers and via the network, system state signals including real time information about a supply state of the online system and a demand state of the online system;

accessing a delivery prediction machine-learning model of the online system, wherein the delivery prediction machine-learning model is trained to predict, in real time, a set of rates of late deliveries for a set of service options for delivery of the plurality of orders;

applying the delivery prediction machine-learning model to the system state signals and the order data including the number of visits of the page of the application within the time period, the number of currently unassigned orders and the number of completed orders within the time period to generate, in real time, a set of late delivery scores, each late delivery score of the set of late delivery scores indicative of a respective rate of the set of rates of late deliveries for a respective service option of the set of service options for delivery of the plurality of orders;

comparing each late delivery score of the set of late delivery scores to a respective threshold score of a set of threshold scores;

responsive to each late delivery score being greater than the respective threshold score, triggering an action in relation to the respective service option for delivery of the plurality of orders;

generating, in response to the triggered action and using each late delivery score, one or more action signals;

sending, via the network, the one or more action signals to each device of the plurality of devices associated with each user of the plurality of users, wherein the sending causes a respective user interface of each device to display information about one or more service options of the set of service options for delivery of a respective order of the plurality of orders;

receiving, via the network and from a device of the plurality of devices associated with a user of the plurality of users, information about the user placing an order of the plurality of orders including a set of items and the user selecting a service option of the one or more service options for delivery of the order;

responsive to the user placing the order and selecting the service option, assigning a servicing of the order to a picker who is a semi-autonomous robot or a fully-autonomous robot;

upon assigning the servicing of the order, instructing the picker operating as the semi-autonomous robot or the fully-autonomous robot to collect the set of items in a retailer location and deliver the set of items to the user by using an autonomous vehicle;

physically collecting, by the picker operating as the semi-autonomous robot or the fully-autonomous robot, the set of items in the retailer location; and delivering, by the picker operating as the semi-autonomous robot or the fully-autonomous robot, the set of items to the user by using the autonomous vehicle.

2. The method of claim 1, wherein receiving the order data further comprises:

receiving information about at least one of a number of orders placed at the online system within a first time period, a number of current orders placed at the online system that are due for delivery, or a number of orders that are fulfilled within a second time period.

3. The method of claim 1, wherein receiving the system state signals further comprises:

receiving information about at least one of a number of pickers of the plurality of pickers that are available for fulfillment of the plurality of orders, acceptance times associated with the plurality of pickers for fulfillment of the plurality of orders, sizes of geographic zones used for assigning the plurality of pickers to fulfill the plurality of orders, information about one or more geographic locations where the plurality of orders were placed, or timestamps of placements for the plurality of orders.

4. The method of claim 1, wherein applying the delivery prediction machine-learning model comprises:

generating, using the received order data and the received system state signals, a first late delivery score of the set of late delivery scores that is indicative of a first rate of the set of rates of late deliveries for a first service option of the set of service options having a first delivery time for delivery of the plurality of orders; and generating, using the received order data and the received system state signals, a second late delivery score of the set of late delivery scores that is indicative of a second rate of the set of rates of late deliveries for a second service option of the set of service options having a second delivery time for delivery of the plurality of orders that is less than the first delivery time.

5. The method of claim 4, wherein triggering the action comprises:

turning off an availability of the first service option for the plurality of orders, when the first late delivery score is greater than a first threshold score; and turning off an availability of the second service option for the plurality of orders, when the second late delivery score is greater than a second threshold score.

6. The method of claim 4, wherein triggering the action comprises:

increasing a price of a service fee for the second service option, when the second late delivery score is greater than a threshold score.

7. The method of claim 1, further comprising:

generating training data by collecting historical data about late deliveries of a collection of orders placed at the online system by a collection of users of the online system over a defined time period; and training the delivery prediction machine-learning model using the training data to generate a set of initial values for a set of parameters of the delivery prediction machine-learning model.

8. The method of claim 1, further comprising:

collecting feedback data with information about selection by the plurality of users of the set of service options for delivery of the plurality of orders; and re-training the delivery prediction machine-learning model by updating, using the collected feedback data, a set of parameters of the delivery prediction machine-learning model.

9. The method of claim 1, further comprising:

acquiring, over a defined time period, data with information about at least one of an updated supply state of the online system or an updated demand state of the online system; and re-training the delivery prediction machine-learning model by updating, using the acquired data, a set of parameters of the delivery prediction machine-learning model.

10. A computer program product comprising a non-transitory computer readable storage medium having instructions encoded thereon that, when executed by a processor, cause the processor to perform steps comprising:

receiving, from a plurality of devices associated with a plurality of users of an online system and via a network, order data related to a plurality of orders placed by the plurality of users at the online system, the order data including real time information about a number of visits of a page of an application of the online system running on the plurality of devices within a time period, a number of currently unassigned orders of the plurality of orders, and a number of completed orders of the plurality of orders within the time period;

receiving, from at least one of the plurality of devices associated with the plurality of users or a plurality of devices associated with a plurality of pickers and via the network, system state signals including real time information about a supply state of the online system and a demand state of the online system;

accessing a delivery prediction machine-learning model of the online system, wherein the delivery prediction machine-learning model is trained to predict, in real time, a set of rates of late deliveries for a set of service options for delivery of the plurality of orders;

applying the delivery prediction machine-learning model to the system state signals and the order data including the number of visits of the page of the application within the time period, the number of currently unassigned orders and the number of completed orders within the time period to generate, in real time, a set of late delivery scores, each late delivery score of the set of late delivery scores indicative of a respective rate of the set of rates of late deliveries for a respective service option of the set of service options for delivery of the plurality of orders;

comparing each late delivery score of the set of late delivery scores to a respective threshold score of a set of threshold scores;

responsive to each late delivery score being greater than the respective threshold score, triggering an action in relation to the respective service option for delivery of the plurality of orders;

generating, in response to the triggered action and using each late delivery score, one or more action signals;

sending, via the network, the one or more action signals to each device of the plurality of devices associated with each user of the plurality of users, wherein the sending causes a respective user interface of each device to display information about one or more service options of the set of service options for delivery of a respective order of the plurality of orders;

receiving, via the network and from a device of the plurality of devices associated with a user of the plurality of users, information about the user placing an order of the plurality of orders including a set of items and the user selecting a service option of the one or more service options for delivery of the order;

responsive to the user placing the order and selecting the service option, assigning a servicing of the order to a picker who is a semi-autonomous robot or a fully-autonomous robot;

upon assigning the servicing of the order, instructing the picker operating as the semi-autonomous robot or the fully-autonomous robot to collect the set of items in a retailer location and deliver the set of items to the user by using an autonomous vehicle;

physically collecting, by the picker operating as the semi-autonomous robot or the fully-autonomous robot, the set of items in the retailer location; and delivering, by the picker operating as the semi-autonomous robot or the fully-autonomous robot, the set of items to the user by using the autonomous vehicle.

11. The computer program product of claim 10, wherein the instructions further cause the processor to perform steps comprising:

receiving the order data related to the plurality of orders by further receiving information about at least one of a number of orders placed at the online system within a first time period, a number of current orders placed at the online system that are due for delivery, or a number of orders that are fulfilled within a second time period.

12. The computer program product of claim 10, wherein the instructions further cause the processor to perform steps comprising:

receiving the system state signals by further receiving information about at least one of a number of pickers of the plurality of pickers that are available for fulfillment of the plurality of orders, acceptance times associated with the plurality of pickers for fulfillment of the plurality of orders, sizes of geographic zones used for assigning the plurality of pickers to fulfill the plurality of orders, information about one or more geographic locations where the plurality of orders were placed, or timestamps of placements for the plurality of orders.

13. The computer program product of claim 10, wherein the instructions further cause the processor to perform steps comprising:

applying the delivery prediction machine-learning model to generate, using the received order data and the received system state signals, a first late delivery score of the set of late delivery scores that is indicative of a first rate of the set of rates of late deliveries for a first service option of the set of service options having a first delivery time for delivery of the plurality of orders; and applying the delivery prediction machine-learning model to generate, using the received order data and the received system state signals, a second late delivery score of the set of late delivery scores that is indicative of a second rate of the set of rates of late deliveries for a second service option of the set of service options having a second delivery time for delivery of the plurality of orders that is less than the first delivery time.

14. The computer program product of claim 13, wherein the instructions further cause the processor to perform steps comprising:

turning off an availability of the first service option for the plurality of orders, when the first late delivery score is greater than a first threshold score; and turning off an availability of the second service option for the plurality of orders, when the second late delivery score is greater than a second threshold score.

15. The computer program product of claim 13, wherein the instructions further cause the processor to perform steps comprising:

increasing a price of a service fee for the second service option, when the second late delivery score is greater than a threshold score.

16. The computer program product of claim 10, wherein the instructions further cause the processor to perform steps comprising:

generating training data by collecting historical data about late deliveries of a collection of orders placed at the online system by a collection of users of the online system over a defined time period; and training the delivery prediction machine-learning model using the training data to generate a set of initial values for a set of parameters of the delivery prediction machine-learning model.

17. The computer program product of claim 10, wherein the instructions further cause the processor to perform steps comprising:

acquiring, over a defined time period, data with information about at least one of an updated supply state of the online system or an updated demand state of the online system; and re-training the delivery prediction machine-learning model by updating, using the acquired data, a set of parameters of the delivery prediction machine-learning model.

18. A computer system comprising:

a processor; and a non-transitory computer-readable storage medium having instructions that, when executed by the processor, cause the computer system to perform steps comprising:

receiving, from a plurality of devices associated with a plurality of users of an online system and via a network, order data related to a plurality of orders placed by the plurality of users at the online system, the order data including real time information about a number of visits of a page of an application of the online system running on the plurality of devices within a time period, a number of currently unassigned orders of the plurality of orders, and a number of completed orders of the plurality of orders within the time period;

receiving, from at least one of the plurality of devices associated with the plurality of users or a plurality of devices associated with a plurality of pickers and via the network, system state signals including real time information about a supply state of the online system and a demand state of the online system;

accessing a delivery prediction machine-learning model of the online system, wherein the delivery prediction machine-learning model is trained to predict, in real time, a set of rates of late deliveries for a set of service options for delivery of the plurality of orders;

applying the delivery prediction machine-learning model to the system state signals and the order data including the number of visits of the page of the application within the time period, the number of currently unassigned orders and the number of completed orders within the time period to generate, in real time, a set of late delivery scores, each late delivery score of the set of late delivery scores indicative of a respective rate of the set of rates of late deliveries for a respective service option of the set of service options for delivery of the plurality of orders;

comparing each late delivery score of the set of late delivery scores to a respective threshold score of a set of threshold scores;

responsive to each late delivery score being greater than the respective threshold score, triggering an action in relation to the respective service option for delivery of the plurality of orders;

generating, in response to the triggered action and using each late delivery score, one or more action signals;

sending, via the network, the one or more action signals to each device of the plurality of devices associated with each user of the plurality of users, wherein the sending causes a respective user interface of each device to display information about one or more service options of the set of service options for delivery of a respective order of the plurality of orders;

receiving, via the network and from a device of the plurality of devices associated with a user of the plurality of users, information about the user placing an order of the plurality of orders including a set of items and the user selecting a service option of the one or more service options for delivery of the order;

responsive to the user placing the order and selecting the service option, assigning a servicing of the order to a picker who is a semi-autonomous robot or a fully-autonomous robot;

upon assigning the servicing of the order, instructing the picker operating as the semi-autonomous robot or the fully-autonomous robot to collect the set of items in a retailer location and deliver the set of items to the user by using an autonomous vehicle;

physically collecting, by the picker operating as the semi-autonomous robot or the fully-autonomous robot, the set of items in the retailer location; and delivering, by the picker operating as the semi-autonomous robot or the fully-autonomous robot, the set of items to the user by using the autonomous vehicle.

* * * * *